US011254553B2

(12) United States Patent
Magerl et al.

(10) Patent No.: US 11,254,553 B2
(45) Date of Patent: Feb. 22, 2022

(54) DECAPPER AND APPARATUS

(71) Applicant: Roche Diagnostics Operations, Inc., Indianapolis, IN (US)

(72) Inventors: Dominik Magerl, Winnenden (DE); Stefan Soentges, Stuttgart (DE); Gernot Schwab, Stuttgart (DE); Richard-Paul Daisley, Stuttgart (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 155 days.

(21) Appl. No.: 16/154,100

(22) Filed: Oct. 8, 2018

(65) Prior Publication Data
US 2019/0039869 A1 Feb. 7, 2019

Related U.S. Application Data

(63) Continuation of application No. PCT/EP2017/058751, filed on Apr. 12, 2017.

(30) Foreign Application Priority Data

Apr. 18, 2016 (EP) ..................................... 16165825

(51) Int. Cl.
*B67B 7/02* (2006.01)
*G01N 35/04* (2006.01)
*B01L 3/00* (2006.01)

(52) U.S. Cl.
CPC ............... *B67B 7/02* (2013.01); *G01N 35/04* (2013.01); *B01L 3/50825* (2013.01); *G01N 2035/0405* (2013.01)

(58) Field of Classification Search
CPC ........... B67B 7/00; B67B 7/182; B67B 7/164; B67B 7/08; B67B 7/15; B67B 7/16; B67B 7/18; B67B 7/24; B67B 7/30; B67B 7/38; B67B 7/0405; B67B 7/02; G01N 35/04; G01N 2035/0405; B01L 3/50825
See application file for complete search history.

(56) References Cited

U.S. PATENT DOCUMENTS

| | | | |
|---|---|---|---|
| 5,819,508 A * | 10/1998 | Kraft | B67B 7/182 53/492 |
| 6,257,091 B1 | 7/2001 | Cohen et al. | |
| 6,477,919 B1 | 11/2002 | Thomas et al. | |
| 6,701,692 B1 | 3/2004 | Niehr | |
| 8,561,377 B2 | 10/2013 | Cirio | |
| 10,494,243 B2 * | 12/2019 | Zumbach | B65B 7/2835 |
| 2003/0103839 A1 | 6/2003 | Osborne et al. | |
| 2006/0216208 A1 | 9/2006 | Li et al. | |
| 2007/0151212 A1 * | 7/2007 | Mayer | B65B 7/161 53/478 |

(Continued)

FOREIGN PATENT DOCUMENTS

| | | |
|---|---|---|
| CN | 104609348 A | 5/2015 |
| EP | 0060073 A1 | 9/1981 |

(Continued)

*Primary Examiner* — Robert J Scruggs
(74) *Attorney, Agent, or Firm* — Roche Diagnostics Operations, Inc.

(57) ABSTRACT

A decapper for removing a cap from a laboratory sample container is presented. The decapper comprises a guidance. An apparatus comprising such a decapper is also presented.

11 Claims, 3 Drawing Sheets

(56) References Cited

U.S. PATENT DOCUMENTS

| | | | |
|---|---|---|---|
| 2008/0078146 A1* | 4/2008 | Cirio | B67B 3/2066 53/490 |
| 2012/0134769 A1* | 5/2012 | Friedman | G01N 35/0099 414/751.1 |
| 2014/0311090 A1 | 10/2014 | Weber | |

FOREIGN PATENT DOCUMENTS

| | | |
|---|---|---|
| EP | 1659091 A1 | 5/2006 |
| EP | 2538227 B1 | 2/2015 |
| WO | 2011/0302009 A1 | 3/2011 |

* cited by examiner

DECAPPER AND APPARATUS

CROSS-REFERENCE TO RELATED APPLICATIONS

This application is a continuation of PCT/EP2017/058751, filed Apr. 12, 2017, which is based on and claims priority to EP 16165825.7, filed Apr. 18, 2016, which is hereby incorporated by reference.

BACKGROUND

The present disclosure generally relates to a decapper for removing a cap from a laboratory sample container and to an apparatus comprising such a decapper.

In laboratories some types of instruments and/or analysis require closed laboratory sample containers such as sample tubes to be opened before laboratory samples are pretreated and/or analyzed. Therefore, such instruments may have a decapper to remove a cap from the container.

Therefore, there is a need for a decapper having improved properties than the decappers of the prior art.

SUMMARY

According to the present disclosure, a decapper for removing a cap from a laboratory sample container is presented. The decapper can comprise a cap gripper comprising at least two gripping jaws. At least one of the at least two gripping jaws can be displaceable between a holding position and a release position in a radial direction. In the holding position, the at least two gripping jaws can hold the cap. In the release position, the cap can be released by the at least two gripping jaws. The decapper can also comprise a guidance. The guidance can be configured to limit a movement of the cap in the radial direction caused by the displacement of the one gripping jaw from its holding position into its release position. The guidance can be separate from the gripping jaws.

In accordance with one embodiment of the present disclosure, an apparatus is presented. The apparatus can comprise a decapper as described above and a cap receiver. The cap receiver can be rotatable between a receiver position and a storage position around a receiver axis. In the receiver position, the decapper and the cap receiver can be arranged such that the cap receiver receives the released cap from the decapper. In the storage position, the cap receiver can allow removal of the cap from the laboratory sample container.

Accordingly, it is a feature of the embodiments of the present disclosure to provide a decapper having improved properties than the decappers of the prior art. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
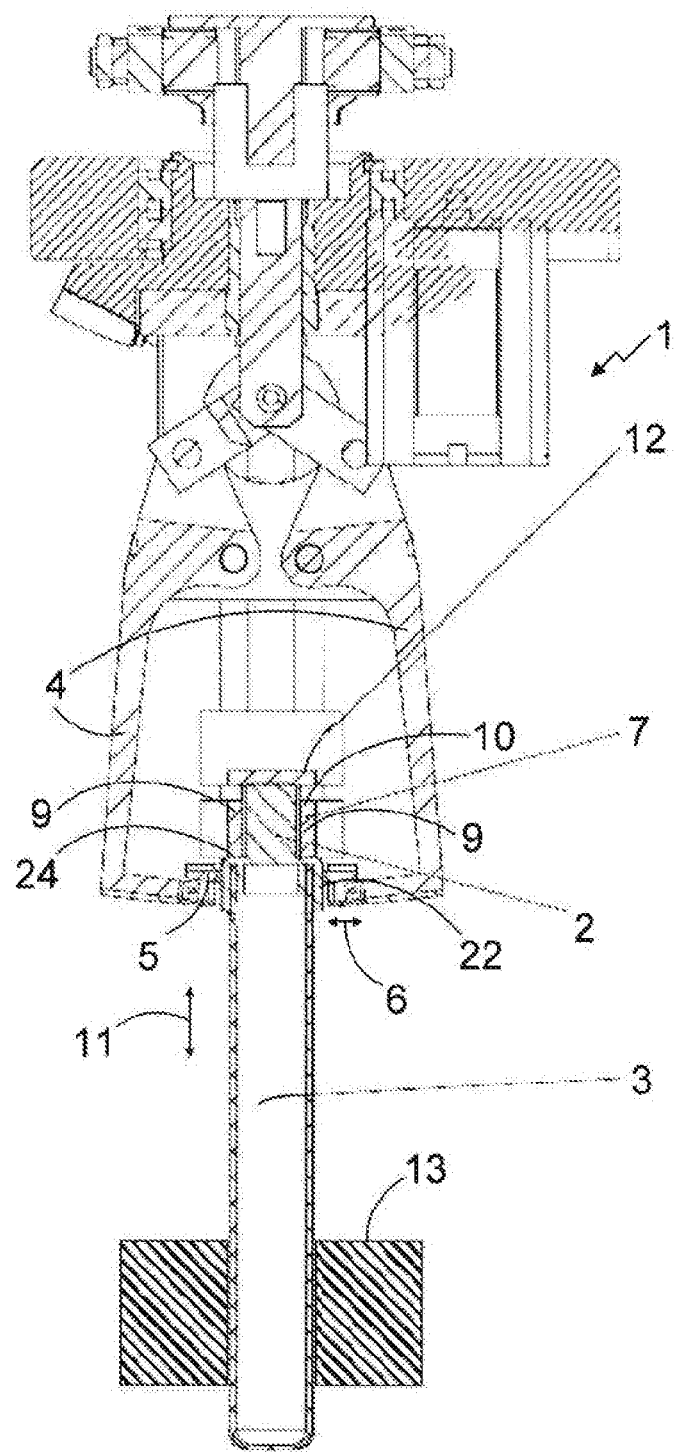
FIG. 1 illustrates a longitudinal section view of a decapper comprising a cap gripper holding a cap, a guidance and a container holder holding a laboratory sample container according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A decapper for removing a cap from a laboratory sample container is presented. The decapper can comprise a cap gripper comprising at least two gripping jaws. At least one of the at least two gripping jaws such as, for example, each gripping jaw, can be displaceable between a holding position and a release position in or along a radial direction. In the holding position, the at least two gripping jaws can hold or fix the cap. In the release position, the cap can be released by the at least two gripping jaws. Additionally, the decapper can comprise a guidance or mechanical stop. The guidance can be configured to limit or prevent a movement of the cap in the radial direction caused by the displacement of the one gripping jaw from its holding position into its release position.

The laboratory sample container can be typically designed as a tube made of glass or transparent plastic and typically can have an opening at an upper end. The container can be used to contain, store and transport a laboratory sample such as a blood sample, a urine sample, or a chemical sample. The cap can be typically used to close or seal the laboratory sample container such as, for example, its opening, and can be typically separate from the container. Depending on the laboratory sample and the container, the cap may have several functions. One may be to keep the container closed and the sample contained for the specified shelf life until time of opening. Another one may be to provide a barrier, e.g., to dirt, oxygen and/or moisture. The cap may comprise rubber and/or plastic or may completely consist of rubber and/or plastic. Further, the cap can typically be a cylindrical shape such as, for example, with a circular cross section. Furthermore, the laboratory sample container and/or the cap can typically attach to each other with sufficient security, e.g., threads, locks and/or adhesives may be used.

The guidance can be separate from the gripping jaws. Furthermore, in the holding position, the at least two gripping jaws may be relatively closer to each other in or along the radial direction than in the release position. In the holding position, the cap may be held by the at least two gripping jaws in a force-fit manner and/or in a form-fit manner. In particular, the gripping jaws may hold the cap at its circumference or periphery. The gripping jaws may be evenly distributed around an axial direction, wherein, in particular, the axial direction may be substantially perpendicular to the radial direction and/or may be substantially parallel or coincidence with a longitudinal axis of the cap. When the cap is released, it may come off the gripping jaws such as, for example, it may fall down due to gravity. In particular, the decapper with its cap gripper may be oriented in such a way, that the axial direction corresponds to the vertical such that the released cap falls down in or along the axial direction. However, the cap may stick or adhere to at least one of the at least two gripping jaws, which can be displaceable between the holding position and the release position in the radial direction. Without the guidance during the displacement of the one gripping jaw from its holding position into its release position, the cap may be entrained or dragged by the one gripping jaw and thereby accelerated or moved in the radial direction. This may cause a problem, e.g., when the cap falls due to the movement in the radial direction somewhere down, where it is not supposed to fall. The cap may be contaminated or polluted with residues of the laboratory sample, e.g., which may be transmitted to other laboratory sample containers, which can cause cross-contamination and interfere with the testing and analysis of other samples. Moreover, bio-hazard may also be an issue as samples may be potentially infectious. Additionally, or alternatively, the cap may block moving parts of other laboratory equipment. Such movement of the cap in the radial direction can be limited or prevented by the guidance. Thereby, the cap may come off the cap gripper and/or may fall down, where it is supposed to do so. Thus, the properties of the decapper can be improved and it may cause fewer problems in a laboratory environment than a decapper without such a guidance.

According to one embodiment, at least one of the at least two gripping jaws of the cap gripper, and in one embodiment, each gripping jaw, can comprise a blade. The blade can be configured to cut or to engrave or to nick into the cap such as, for example, into the circumference of the cap. Thereby, the cap can be held well. In one embodiment, the blade may extend around the axial direction and/or along the circumference of the cap. Furthermore, the blade may comprise a metal or may completely consist of a metal.

According to one embodiment, the guidance can comprise at least two guidance elements. The at least two guidance elements can be arranged in or along the radial direction opposite to each other such that they can surround the held cap on opposite sides. The at least two guidance elements can be configured to limit or prevent a movement of the cap in the radial direction. This can be advantageous, when several of the at least two gripping jaws are displaceable between a holding position and a release position in or along the radial direction. In one embodiment, the at least two guidance elements may be separate from each other.

According to one embodiment, the at least two guidance elements can form a ring such as, for example, a closed ring such that the ring can extend around the axial direction and/or along the circumference of the cap completely. In one embodiment, the ring may have a circular cross section. Furthermore, the ring may be one piece.

According to one embodiment, a distance of the at least two guidance elements or a distance in between them in the radial direction can be smaller than about 20 mm and in one embodiment, smaller than about 12 mm. Most of the caps for laboratory sample containers can have a diameter smaller than this distance value, whereby they may be surrounded by the at least two guidance elements, when being held by the cap gripper. In the case where the at least two guidance elements form a ring, the distance may correspond to a diameter of the ring.

According to one embodiment, a distance of the at least two guidance elements in the radial direction can be smaller than a distance of the at least two gripping jaws or in between them in the release position in the radial direction.

In one embodiment, the distance of the at least two guidance elements in the radial direction may be larger than the distance of the at least two gripping jaws in the holding position in the radial direction.

According to one embodiment, the guidance with its at least two guidance elements can be movable in the axial direction with respect to the cap gripper with its at least two gripping jaws. A distance of the at least two guidance elements in the radial direction can be smaller than a distance of the at least two gripping jaws in the holding position in the radial direction. In one embodiment, the axial direction may be substantially perpendicular to the radial direction and/or may correspond to the vertical. This embodiment can be advantageous for caps having a shoulder or step in between a relatively axially lower, relatively wider part and a relatively axially higher, relatively narrower part such as, for example, caps having a form appearance comprising a number of cylinders having different sizes. In one embodiment, a first cylinder can be a circular cylinder with a diameter in the range from about 13 mm to about 18 mm and a height in the range from about 7 mm to about 20 mm. An optional second cylinder can be a circular cylinder with a maximum diameter of about 11 mm and a maximum height of about 16 mm. Thereby, the cap may be held in its relatively wider part by the at least two gripping jaws in the holding position while the at least two guidance elements may sit on the shoulder due to gravity and surround the relatively narrower part. When the cap is released, it may be pushed in the axial direction by the at least two guidance elements from the cap gripper with its at least two gripping jaws away. Additionally, an outer distance of the at least two guidance elements in or along the radial direction may be smaller than a distance of the at least two gripping jaws in the release position in or along the radial direction such that the at least two guidance elements may axially move in between the at least two gripping jaws.

According to one embodiment, the decapper can comprise a cap push element. The cap push element can be movable in the axial direction with respect to the cap gripper with its at least two gripping jaws. Additionally, the cap push element can be configured to expose a pushing force on the cap such as, for example, on a front side of the cap. In one embodiment, the axial direction may be substantially perpendicular to the radial direction and/or may correspond to the vertical. Furthermore, the cap push element may have the form of a disk extending in the radial direction. This embodiment can enable the cap to be pushed in the axial direction by the cap push element from the cap gripper with its at least two gripping jaws away when the cap is released due to gravity. Additionally, a diameter of the cap push element in or along the radial direction may be smaller than a distance of the at least two gripping jaws in the release position in or along the radial direction such that the cap push element may axially move in between the at least two gripping jaws.

According to one embodiment, a height of the guidance in the axial direction can be in the range from about 5 mm to about 15 mm. The height of the guidance in the axial direction may be exactly 10 mm.

According to an embodiment, the decapper can comprise a container holder. The container holder can be configured to hold the laboratory sample container. Additionally, the container holder and the cap gripper with its at least two gripping jaws can be displaceable relatively to each other in the axial direction such that the held cap can be removed or pulled away from the laboratory sample container. Thereby, in the case where the cap has, for example, a rubber stopper and is attached to the container by a friction fit, it may be removed from the laboratory sample container. In one embodiment, the axial direction may correspond to the vertical and/or the cap gripper may be arranged vertically above the container gripper such that, after the removal of the cap, the open end of the laboratory sample container can be vertically above the rest of the container. Thereby, the laboratory sample may stay in the container and may not spill. In addition, the container holder may be configured to release the laboratory sample container after the removal of the cap from it. In one embodiment, the container holder may comprise a gripper.

According to an embodiment, the container holder and the cap gripper with its at least two gripping jaws can be rotatable relatively to each other around the axial direction such that the held cap can be unscrewed from the laboratory sample container. Thereby, in the case where the cap is, for example, threaded and is screwed on the container, it may be removed from the laboratory sample container by the relative axial and rotational movement of the container holder and the cap gripper.

An apparatus comprising a decapper as described above and a cap receiver is presented. The cap receiver can be rotatable between a receiver position and a storage position around a receiver axis. In the receiver position, the decapper and the cap receiver can be arranged such that the cap receiver can receive the released cap from the decapper. In the storage position, the cap receiver can allow the removal of the cap from the laboratory sample container. In one embodiment, the cap receiver may be arranged vertically below the at least two gripping jaws of the cap gripper of the decapper. Thereby, the released cap may fall onto and/or into the cap receiver due to gravity. In one embodiment, the receiver axis may correspond to the vertical. Thereby, it may be rotated with relatively low effort. In addition, the apparatus may comprise a cap disposal compartment and the cap receiver may be connected to the cap disposal compartment such that the received cap can be passed by the cap receiver into the cap disposal compartment.

According to an embodiment, the apparatus can comprise a mounting base. Additionally, the cap receiver can be mechanically connected to the mounting base by a key hole coupling system. Thereby, the cap receiver may be reversibly or nondestructively detached from the mounting base in relatively short time. Hence, the detached cap receiver may be cleaned from contaminations caused by the received cap. In addition, the apparatus may comprise an index pin, wherein the index pin may be configured to secure the cap receiver and the key hole coupling system, respectively, against unintentional detachment.

Figure 2:
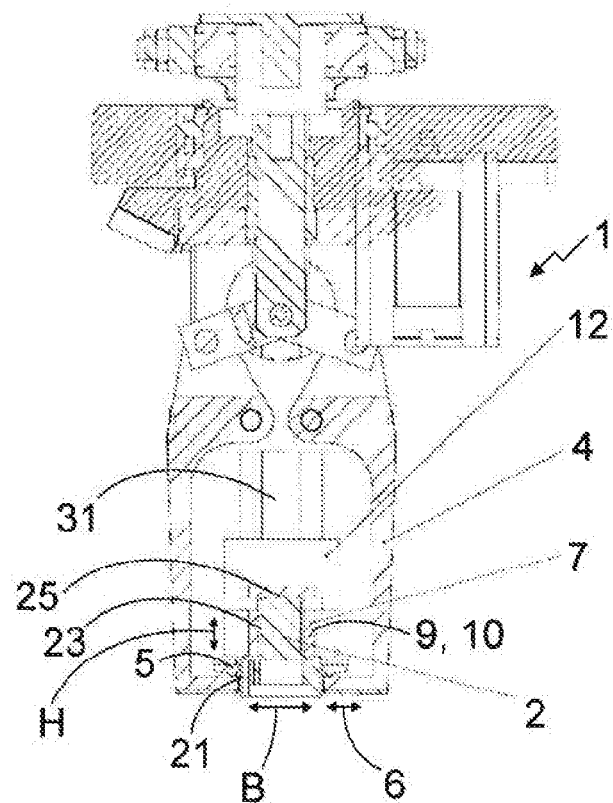
FIG. 2 illustrates a longitudinal section of the decapper of FIG. 1 with the cap gripper holding the cap removed from the laboratory sample container according to an embodiment of the present disclosure.
Figure 3:
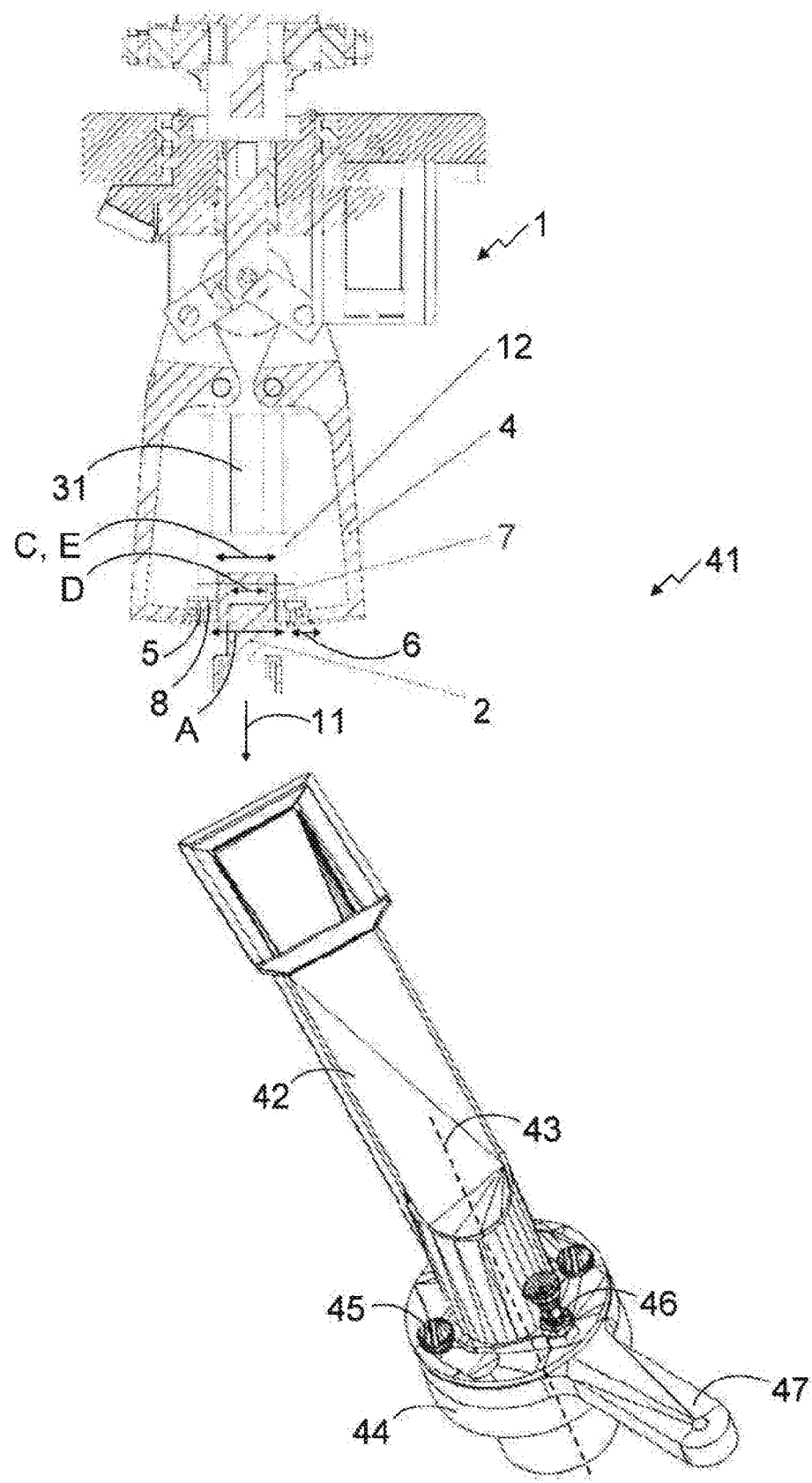
FIG. 3 illustrates a longitudinal section view of an apparatus comprising the decapper of FIG. 1 and a cap receiver with the cap released, wherein the cap receiver is depicted in perspective view according to an embodiment of the present disclosure.

Turning to FIGS. 1-3, FIGS. 1-3 show a decapper 1 for automatically removing a cap 2 from a laboratory sample container 3. The decapper 1 can comprise a cap gripper 4 comprising two gripping jaws 5. In a different embodiment, the cap gripper may comprise at least three, four, five, six or more gripping jaws. Both gripping jaws 5 can be displaceable between a holding position and a release position in or along a radial direction 6. In a different embodiment, it may be sufficient that only one of the at least two gripping jaws may be displaceable between the holding position and the release position in the radial direction. In the holding position, the gripping jaws 5 can hold or fix the cap 2, as can be seen in FIGS. 1 and 2. In the release position, the cap 2 can be released by the gripping jaws 5, as can be seen in FIG. 3. Additionally, the decapper 1 can comprise a guidance or mechanical stop 7. The guidance 7 can be configured to limit or prevent a movement of the cap 2 in the radial direction 6 caused by the displacement of one of the gripping jaws 5 from its holding position into its release position.

In detail, the laboratory sample container 3 can be designed as a tube having an opening at an, in FIG. 1, upper end. In FIG. 1 the cap 2 can close the container 3 such as, for example, its opening. The cap 2 can be threaded and screwed on the container 3. Further, the cap 2 can have a cylindrical shape with a circular cross section. Furthermore, the cap 2 can completely comprise of rubber and/or plastic.

The gripping jaws 5 can be evenly distributed around an axial direction 11, wherein the axial direction 11 can be substantially perpendicular to the radial direction 6. In the holding position, the gripping jaws 5 can be relatively closer to each other in the radial direction 6 than in the release position. The gripping jaws 5 can hold the cap 2 at its circumference or periphery 21 in a force-fit manner and in a form-fit manner; a longitudinal axis of the cylindrical shaped cap 2 coincidences with the axial direction 11. In detail, each gripping jaw 5 can comprise a blade 8. In FIGS. 1 and 2, the blades 8 can cut or engrave or nick into the cap 2 such as, for example, into the circumference 21 of the cap 2. The blades 8 can be completely comprised of a metal. The gripping jaws 5 and the blades 8, respectively, can extend around the axial direction 11 and thereby along the circumference 21 of the cap 2 almost completely.

Each of the gripping jaws 5 can be attached to a finger or an arm of the cap gripper 4. The fingers may be moved by at least one actuator for the displacement of the gripping jaws 5 between their holding position and their release position.

In addition to the cap gripper 4 and the guidance 7, the decapper 1 can comprise a container holder 13. The container holder 13 can hold the laboratory sample container 3 in such a way that a longitudinal axis of the container 3, in the form of the tube, can coincidence with the axial direction 11. In the shown embodiment, the container holder 13 can be a gripper. Further, the container holder 13 and the cap gripper 4 with its gripping jaws 5 can be displaceable relatively to each other in the axial direction 11. Additionally, the container holder 13 and the cap gripper 4 with its gripping jaws 5 can be rotatable relatively to each other around the axial direction 11. Thereby, the held cap 2 can be unscrewed from the laboratory sample container 3 such that the cap 2 can be removed from the container 3. In a different embodiment, such as in the case where the cap has a rubber stopper and is attached to the container by a friction fit, it may be sufficient that the container holder and the cap gripper with its gripping jaws may be displaceable relatively to each other in the axial direction only such that the held cap can be pulled away from the laboratory sample container. In the shown embodiment, the cap gripper 4 can be arranged vertically above the container holder 13 such that, after the removal of the cap 2, the open end of the container 3 can be vertically above the rest of the container. In one embodiment, the decapper 1 with its cap gripper 4 and its container holder 13 can be oriented in such a way that the axial direction 11 can correspond to the vertical.

After the removal of the cap 2 from the container 3, the cap 2 may be released by the gripping jaws 5. Then, it may come off the gripping jaws 5 such that it may fall down due to gravity as can be seen in FIG. 3. However, the cap 2 may stick or adhere to one of the gripping jaws 5. A movement of the cap 2 in the radial direction 6 caused by the displacement of the gripping jaws 5 from their holding position into their release position can be limited by the guidance 7, which can be separate from the gripping jaws 5.

In detail, the guidance 7 can comprise two guidance elements 9. The guidance elements 9 can be arranged in the radial direction 6 opposite to each other such that they can surround the held cap 2 on opposite sides, as can be seen in FIGS. 1 and 2. The guidance elements 9 can be configured to limit or prevent a movement of the cap 2 in the radial direction 6. The guidance elements 9 can extend around the axial direction 11 and thereby along the circumference 21 of the cap 2 such as, for example, completely. In the shown embodiment, the guidance elements 9 can form a ring 10 such as, for example, a closed ring. The ring 10 can have a circular cross section. Generally, the guidance elements may be separate from each other. Furthermore, in a different embodiment, the guidance may comprise at least three, four, five, six or more guidance elements. The number of guidance elements may correspond to the number of gripping jaws. However, in the shown embodiment, the ring 10 can be one piece.

In the shown embodiment, a height H of the guidance 7, respectively, its guidance elements 9, in the axial direction 11 can be about 10 mm.

A distance D of the at least two guidance elements 9 in the radial direction 6, respectively a diameter of the ring 10, can be smaller than a distance A of the gripping jaws 5 in the release position in the radial direction 6, as can be seen in FIG. 3. Thereby, the released cap 2 cannot follow one of the gripping jaws 5 from its holding position into its release position in the radial direction 6. It can be stopped before by the guidance 7. In the shown embodiment, the distance D may be 11.4 mm+/−0.6 mm, or, in another embodiment, 11.4 mm+/−0.2 mm.

Furthermore, the distance D can be smaller than a distance B of the gripping jaws 5 in the holding position in the radial direction 6. In addition, the guidance 7 with its guidance elements 9 can be movable in the axial direction 11 with respect to the cap gripper 4 with its gripping jaws 5. In detail, the decapper 1 can comprise a rail 31 extending in or along the axial direction 11. The rail 31 can be fixed to the cap gripper 4 with its gripping jaws 5 and the guidance 7 with its guidance elements 9 can be displaceable mounted on the rail 31.

This embodiment can be advantageous for the cap 2 of the present example, which can have a shoulder or step 24 in between a relatively axially lower, relatively wider part 22 and a relatively axially higher, relatively narrower part 23. The cap 2 can have a form appearance comprising two cylinders having different sizes. The first cylinder can be a circular cylinder with a diameter in the range from about 13 mm to about 18 mm and a height in the range from about 7 mm to about 20 mm. The second cylinder can be a circular cylinder with a maximum diameter of 11 mm and a maximum height of 16 mm. The distance B of the gripping jaws 5 in the holding position in the radial direction 6 can correspond to a diameter of the cap in the relatively wider part 22. Before the cap 2 is held by the gripping jaws 5 in the holding position, they may be in their release position and the cap 2 may be introduced into the cap gripper 4. For example, the closed container 3 may be held by the container holder 13. The container holder 13 and the cap gripper 4 may be relatively moved towards each other in the axial direction 11. Thereby, the cap 2 with its relatively narrower part 23 ahead may be moved in the axial direction 11 towards the cap gripper 4 with its gripping jaws 5. At first, the guidance elements 9 may surround the relatively narrower part 23. When the cap 2 with its shoulder 24 is moved against the guidance elements 9, the cap 2 may move the guidance elements 9 in the axial direction 11 with respect to the cap gripper 4 with its gripping jaws 5. Thereafter, the cap 2 may be held in its relatively wider part 22 by the gripping jaws 5 in the holding position while the guidance elements 9 may seat on the shoulder 24 due to gravity, as can be seen in FIGS. 1 and 2. When the removed cap 2 is released, it can be pushed in the axial direction 11 by the guidance elements 9 from the cap gripper 4 with its gripping jaws 5 away, in FIG. 3, downwards. In the shown embodiment, an outer distance C of the at least two guidance elements 9 in the radial direction 6, respectively an outer diameter of the ring 10, can be smaller than the distance A of the gripping jaws 5 in the release position in the radial direction 6 such that the guidance elements 9 may axially move in between the gripping jaws 5.

In a different embodiment, the distance of the at least two guidance elements in the radial direction may be larger than a distance of the at least two gripping jaws in the holding position in the radial direction. Additionally, or alternatively, the guidance may be not movable in the axial direction with respect to the cap gripper with its gripping jaws. It may be axially fixed. In one embodiment, the guidance may be positioned above, below or on a level along the axial direction with respect to cap gripper with its gripping jaws.

In the shown embodiment, the decapper 1 can comprise a cap push element 12 in the form of a disk extending in the radial direction 6. The cap push element 12 can be movable in the axial direction 11 with respect to the cap gripper 4 with its at least two gripping jaws 5. In detail, the cap push element 12 can be displaceable mounted on the rail 31. Additionally, the cap push element 12 can be configured to expose a pushing force on the cap 2 such as, for example, on a front side 25 of the cap 2. When the cap 2 with its front side 25 ahead is introduced into the cap gripper 4, it can be moved against the cap push element 12 and the cap 2 may move the cap push element 12 in the axial direction 11 with respect to the cap gripper 4 with its gripping jaws 5. When the removed cap 2 is released, it can be pushed in the axial direction 11 by the cap push element 12 from the cap gripper 4 with its gripping jaws 5 away, in FIG. 3, downwards. In the shown embodiment, a diameter E of the cap push element 12 in the form of the disk in the radial direction 6 can be smaller than the distance A of the gripping jaws 5 in the release position in the radial direction 6.

The decapper 1 can be part of an apparatus 41, as can be seen in FIG. 3. The apparatus 41 can comprise a cap receiver 42 in addition to the decapper 1. The cap receiver 42 can be rotatable between a receiver position and a storage position around a receiver axis 43 corresponding to the vertical. In the receiver position, the decapper 1 and the cap receiver 42 can be arranged such that the cap receiver 42 can receive the released cap 2 from the decapper 1, as can be seen in FIG. 3. In detail, the cap receiver 42 can be arranged vertically below the gripping jaws 5 of the cap gripper 4 of the decapper 1. Thereby, the released cap 2 may fall onto and/or into the cap receiver 42 due to gravity. Due to the guidance 7, the cap 2 can actually fall down where it is supposed to do so. In the storage position, the cap receiver 42 can allow for the removal of the cap 2 from the laboratory sample container 3, as can be seen in FIGS. 1 and 2.

Furthermore, the apparatus 41 can comprise a mounting base 47 in the form of an adapter plate. The cap receiver 42 can be mechanically connected to the mounting base 47 by a key hole coupling system 45. The mounting base 47 can be rotatable around the receiver axis 43 as well. The rotation of the cap receiver 42 between the receiver position and the storage position can be performed by a rotational movement of the mounting base 47. In addition, the apparatus can comprise a lower basis 44 and the mounting base 47 can be connected to the lower basis 44 by a rotatable connection. The lower basis 44 may not be rotatable. In detail, the key hole coupling system 45 can comprise guiding screws and corresponding grooves. In addition, the apparatus 41 can comprise an index pin 46. The index pin 46 can be configured to secure the cap receiver 42 and the key hole coupling system 45, respectively, against unintentional detachment from the mounting base 47, when being rotated between the receiver position and the storage position. By operating the index pin 46 and rotating the cap receiver 42 relatively to the mounting base 47 and the lower basis 44, respectively, around the receiver axis 43, the cap receiver 42 may be reversibly or nondestructively detached from the mounting base 47.

In addition, the apparatus 41 can comprise a cap disposal compartment and the cap receiver 42 can be connected to the cap disposal compartment such that the received cap 2 can be passed by the cap receiver 42 into the cap disposal compartment.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A decapper for removing a cap from a laboratory sample container, the decapper comprises:
a cap gripper comprising at least two gripping jaws, wherein at least one of the at least two gripping jaws is displaceable between a holding position and a release position in a radial direction, wherein in the holding position, the at least two gripping jaws hold a lower vertical section of the cap, and wherein in the release position, the cap is released by the at least two gripping jaws; and
a guidance, wherein the guidance is configured to limit a movement of the cap in the radial direction caused by the displacement of the one gripping jaw from its holding position into its release position and wherein the guidance is separate and vertically above from the gripping jaws so that an upper vertical section of the cap passes through the cap gripper and is confined by the guidance during displacement of the one gripping jaw, wherein at least one of the at least two gripping jaws comprises a blade, wherein the blade is configured to cut into the cap.

2. The decapper according to claim 1, wherein the guidance comprises at least two guidance elements, wherein the at least two guidance elements are arranged in the radial direction opposite to each other such that they surround the held cap on opposite sides.

3. The decapper according to claim 2, wherein the at least two guidance elements form a ring.

4. The decapper according to claim 2, wherein a distance (D) of the at least two guidance elements in the radial direction is smaller than 20 mm.

5. The decapper according to claim 2, wherein a distance (D) of the at least two guidance elements in the radial direction is smaller than 12 mm.

6. The decapper according to claim 2, wherein a distance (D) of the at least two guidance elements in the radial direction is smaller than a distance (A) of the at least two gripping jaws in the release position in the radial direction.

7. The decapper according to claim 2, wherein the guidance with its at least two guidance elements is movable in an axial direction with respect to the cap gripper with its at least two gripping jaws and wherein a distance (D) of the at least two guidance elements in the radial direction is smaller than a distance (B) of the at least two gripping jaws in the holding position in the radial direction.

8. The decapper according to claim 1, further comprises,
a cap push element, wherein the cap push element is movable in an axial direction with respect to the cap gripper with its at least two gripping jaws and wherein the cap push element is configured to expose a pushing force on the cap.

9. The decapper according to claim 1, wherein a height (H) of the guidance in an axial direction is in the range from 5 mm to 15 mm.

10. An apparatus, the apparatus comprising:
a decapper according to claim 1; and
a cap receiver, wherein the cap receiver is rotatable between a receiver position and a storage position around a receiver axis, wherein in the receiver position, the decapper and the cap receiver are arranged such that the cap receiver receives the released cap from the decapper, and wherein in the storage position, the cap receiver allows removal of the cap from the laboratory sample container.

11. The apparatus according to claim 10, further comprises,
a mounting base, wherein the cap receiver is mechanically connected to the mounting base by a key hole coupling system.

* * * * *